United States Patent [19]

Whitling

[11] Patent Number: 5,521,950
[45] Date of Patent: May 28, 1996

[54] TOOL FOR UNLATCHING CONTROL ROD WITHOUT REMOVING FUEL SUPPORT

[75] Inventor: Robert W. Whitling, Morgan Hill, Calif.

[73] Assignee: General Electric Company, San Jose, Calif.

[21] Appl. No.: 280,901

[22] Filed: Jul. 27, 1994

Related U.S. Application Data

[62] Division of Ser. No. 64,384, May 21, 1993, Pat. No. 5,473,645.

[51] Int. Cl.$^6$ .................................................. G21C 19/00
[52] U.S. Cl. ........................................................ 376/260
[58] Field of Search ................................ 376/260, 262; 294/97, 95, 53.5

[56] References Cited

U.S. PATENT DOCUMENTS

| | | | |
|---|---|---|---|
| 2,789,859 | 4/1957 | Woellner | 294/97 |
| 4,240,656 | 12/1980 | Eiffinger | 294/53.5 |
| 5,154,466 | 10/1992 | Neuhaus | 294/50.9 |
| 5,329,563 | 7/1994 | Baversten | 376/260 |

*Primary Examiner*—Daniel D. Wasil
*Attorney, Agent, or Firm*—James E. McGinness

[57] ABSTRACT

A tool set and a method of using those tools in combination is disclosed that are especially well adapted to the function of rearranging and/or replacing the control rods and fuel supports in a boiling water reactor. The tool set includes a grapple that is capable of simultaneously picking up both a control rod and its associated fuel support. A separate unlatching tool is provided for pulling the control rod's release handle in order to decouple the control rod from a control rod drive. A storage rack that may be mounted in the reactor pressure vessel is provided for storing a fuel support and a pair of control rods when the positions of selected control rods are being shifted about the reactor core area. In the method aspect of the invention, the unlatching tool is used to pull the control rod's release handle. Thereafter, the grapple lifts the control rod and its associated fuel support as a unit. When rearranging the positions of the control rods, a first control rod and its associated fuel support are placed the storage rack. Then a second control rod/fuel support assembly is removed in a similar manner and the second control rod is placed in the storage rack. Thereafter, the first control rod may be removed from the storage rack and placed in the position formally occupied by the second control rod with the same fuel support that was removed from the second location.

2 Claims, 6 Drawing Sheets

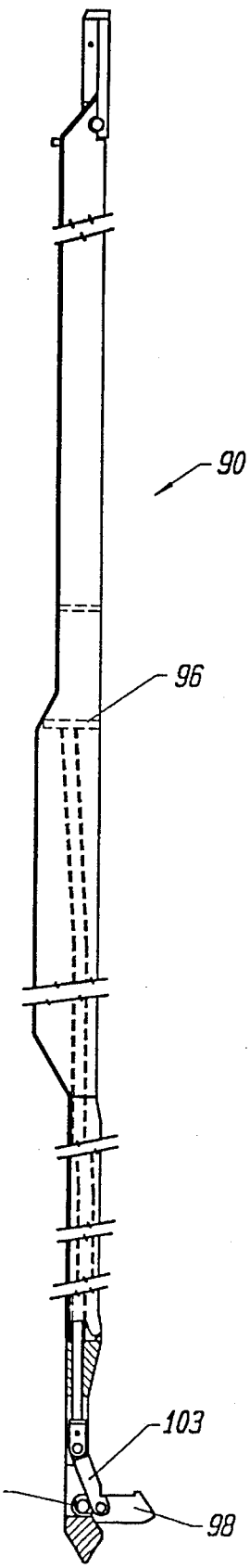
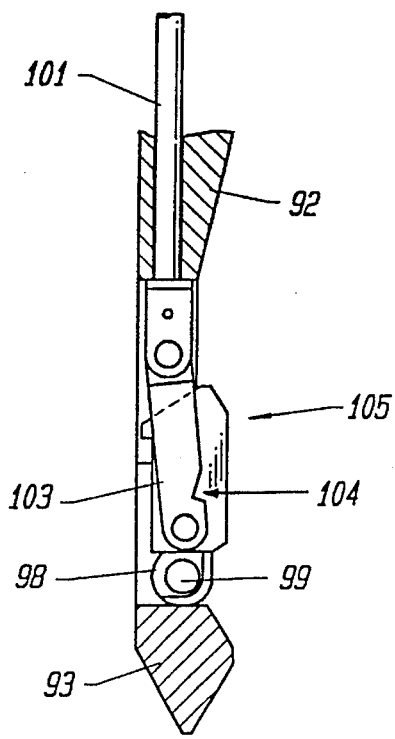
FIG. 6A
FIG. 5
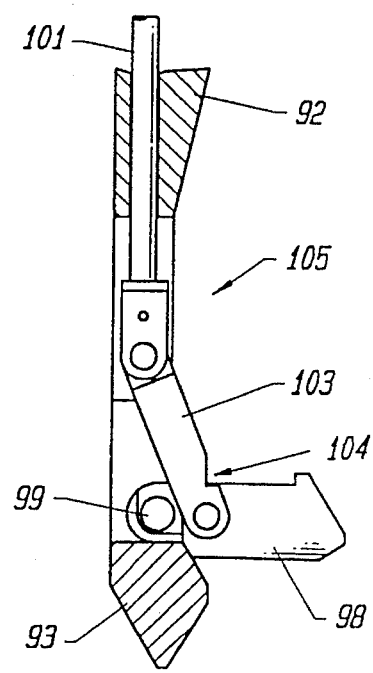
FIG. 6B

TOOL FOR UNLATCHING CONTROL ROD WITHOUT REMOVING FUEL SUPPORT

This is a division of application Ser. No. 08/064,384, filed May 21, 1993, now U.S. Pat. No. 5,473,645.

BACKGROUND OF THE INVENTION

The present invention relates generally to tooling and a process for inserting, rearranging and/or removing the control rods in a boiling water reactor pressure vessel.

The control rods in a boiling water reactor contain an absorbent material that when positioned in the reactor core can be used to slow the fission rate of the nuclear fuel. However, the absorbent material is subject to degradation after extended use. Therefore, it is periodically necessary to replace the control rods. Since different regions of the reactor core have different levels of irradiation fluence, in order to reduce expenses, it is common to periodically reposition the control rods within the core to maximize their useful life.

In order to pull a control rod out of its associated core location, it is also necessary to pull out the associated fuel support since the control rod's velocity limiter cannot slide past an installed fuel support. Therefore, the tools commonly used to reposition and/or replace the control rods include a first grapple for lifting the fuel support. A second grapple is then used for uncoupling the control rod from its associated control rod drive and lifting the uncoupled control rod. Operators that use just these two tools have been known to occasionally drop the control rod. Therefore, a third grapple tool is often used to grab the top bail handle of the control rod when the control rod is being lifted.

When the control rods are being rearranged, it is customary to set the fuel support on the reactor pool floor in a sheltered area. The control rod is then taken out of the pressure vessel and placed in a fuel pool located adjacent the pressure vessel. When the control rod is to be reinserted, it must be transferred back from the fuel pool to the pressure vessel. When the fuel support is to be reinserted, it must be picked up from the floor. These transferring motions take a relatively long time and in the case of the control rods result in the undesirable exposure of a radioactive component.

SUMMARY OF THE INVENTION

Accordingly, it is an objective of the present invention to provide an improved tool set and an improved method for rearranging and/or replacing control rods in a boiling water reactor.

To achieve the foregoing and other objects and in accordance with the purpose of the present invention, a tool set and a method of using those tools is disclosed that is especially well adapted to the function of rearranging and/or replacing the control rods and fuel supports in a boiling water reactor. In a first aspect of the invention a grapple is disclosed that is capable of simultaneously picking up both a control rod and its associated fuel support. The grapple includes a frame, a slidable control rod holding mechanism that is adapted to grab the bail handle of a control rod, and a fuel support holding mechanism adapted to grasp a fuel support.

In a second aspect of the invention, an unlatching tool is disclosed for pulling the control rod's release handle in order to decouple the control rod from a control rod drive. The unlatching tool includes a housing having a positioning projection adapted to engage the fuel support associated with the control rod being detached in order to help position the unlatching tool during use. An unlatching finger is pivotally mounted to the housing near its distal end and an actuating mechanism is provided to actuate the unlatching finger. The actuating mechanism is adapted to move the finger between a withdrawn position wherein the finger is substantially parallel with the housing and an extended position wherein the finger extends substantially perpendicular to the housing such that it can readily engage the control rod's release handle.

In a third aspect of the invention a storage rack suitable for mounting within the reactor pressure vessel is provided for storing a fuel support and a pair of control rods when the control rods are being shifted about the reactor core area. The storage rack is designed such that it can be temporarily installed in the reactor pressure vessel and includes a frame, a pair of control rod holders and a fuel support storage seat for holding a fuel support. The control rod holders each include a control rod seat that is shaped to receive the socket of a control rod velocity limiter.

In a method aspect of the invention, a method of removing and/or rearranging the position of control rods and fuel supports is disclosed. The method includes the step of pulling the control rod release handle using an unlatching tool. Thereafter, the control rod and its associated fuel support are lifted together using a single grapple tool that is separate from the unlatching tool. When removing the control rod, the control rod can be simply lifted out of the pressure vessel. However, when rearranging the control rods, the first control rod and its associated fuel support are placed a storage rack that is temporarily positioned within the reactor pressure vessel. Then the unlatching and lifting out steps are repeated for a second control rod/fuel support assembly. The second control rod is placed in the storage rack without releasing the second fuel support. Thereafter, the first control rod is removed from the storage rack and placed together with the second fuel support in the position formerly occupied by the second control rod.

BRIEF DESCRIPTION OF THE DRAWINGS

The invention, together with further objects and advantages thereof, may best be understood by reference to the following description taken in conjunction with the accompanying drawings in which:

FIG. 5 is a cross-sectional side view of a latching tool.

FIGS. 6A and 6B are cross-sectional views of the distal end of the latching tool shown in FIG. 5 in the withdrawn and engaged positions respectively.

DETAILED DESCRIPTION OF THE INVENTION

Figure 1:
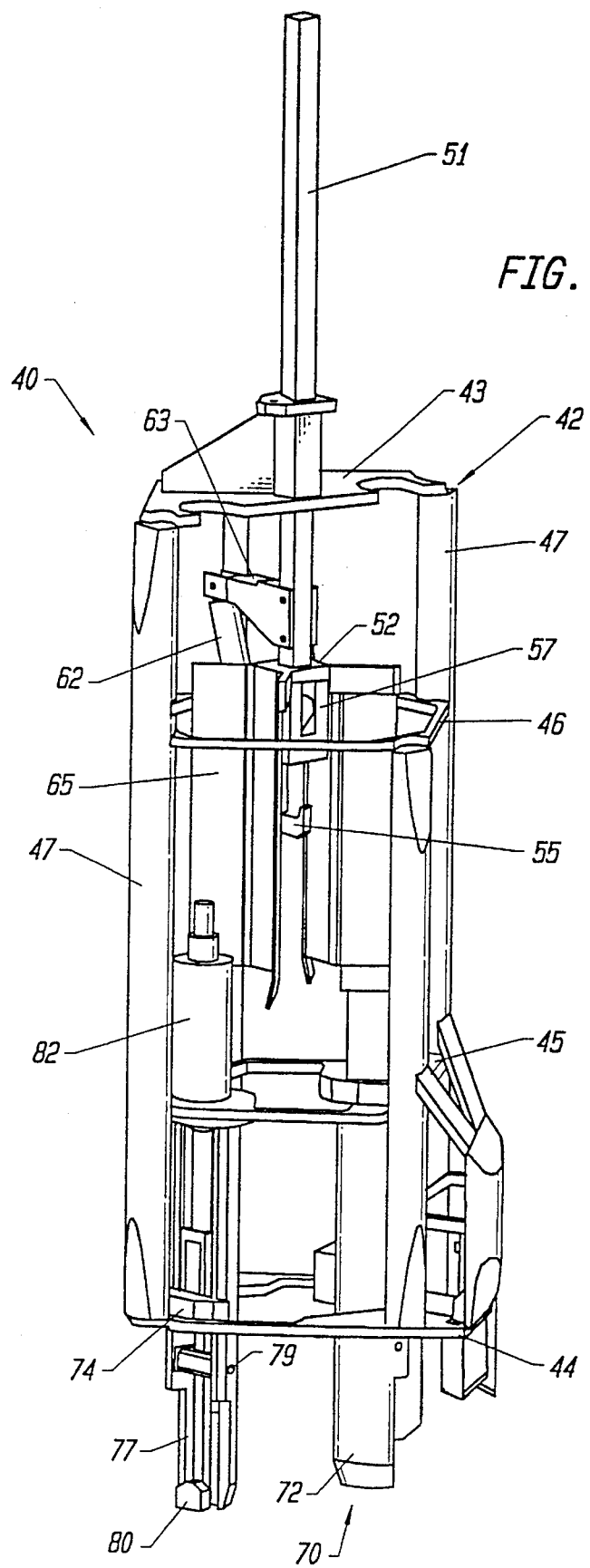
FIG. 1 is a perspective view of a control rod and fuel support grapple.

In the described embodiment of the present invention, two tools and a temporary storage rack are provided and used in combination to lift, remove and replace fuel supports and control rods used within the reactor pressure vessel in boiling water reactors. The tools include a grapple 40, (see FIG. 1) a control rod unlatching tool 90 (see FIG. 5) and a temporary storage rack 150 (see FIG. 7).

The grapple 40 is used to grab both the top bail handle 22 of a control rod 20 (see FIG. 7) and a fuel support 30 (not shown). The unlatching tool 90 is used to pull the control rod release handle (not shown) which is used to decouple the control rod 20 and its velocity limiter 29 from a control rod drive (not shown). Once the control rod drive has been released, the grapple is designed to lift the control rod and its associated fuel support together as a unit.

When the position of a control rod is to be switched within the reactor core, the grapple and unlatching tool may be used together to unlatch and remove a control rod along with the fuel support and place it in the storage rack. A second control rod/fuel support is removed in a similar manner, and the second control rod is also placed in the storage rack. The second fuel support is retained and placed over the first control rod, which is grappled and moved to the second core location. The control rod and fuel support are placed in the core. The grapple is then used to grab the first fuel support from the storage rack, place it over the second control rod, grapple it, and move them both to the first cell location. This process or a variation using more than two control rods can be repeated until all of the control rods that are to be shifted have been moved.

Referring initially to FIGS. 1–4, the grapple 40 will be described. As seen therein, the grapple 40 includes a frame 42, a control rod hooking mechanism 55 having a sliding bar 51, and a pair of spaced fuel support hooking mechanisms 70. The control rod hooking mechanism 55 is designed to engage the control rod's top bail handle 22. The fuel support hooking mechanisms 70 face in opposing directions and are designed to grab the fuel support 30.

Figure 2:
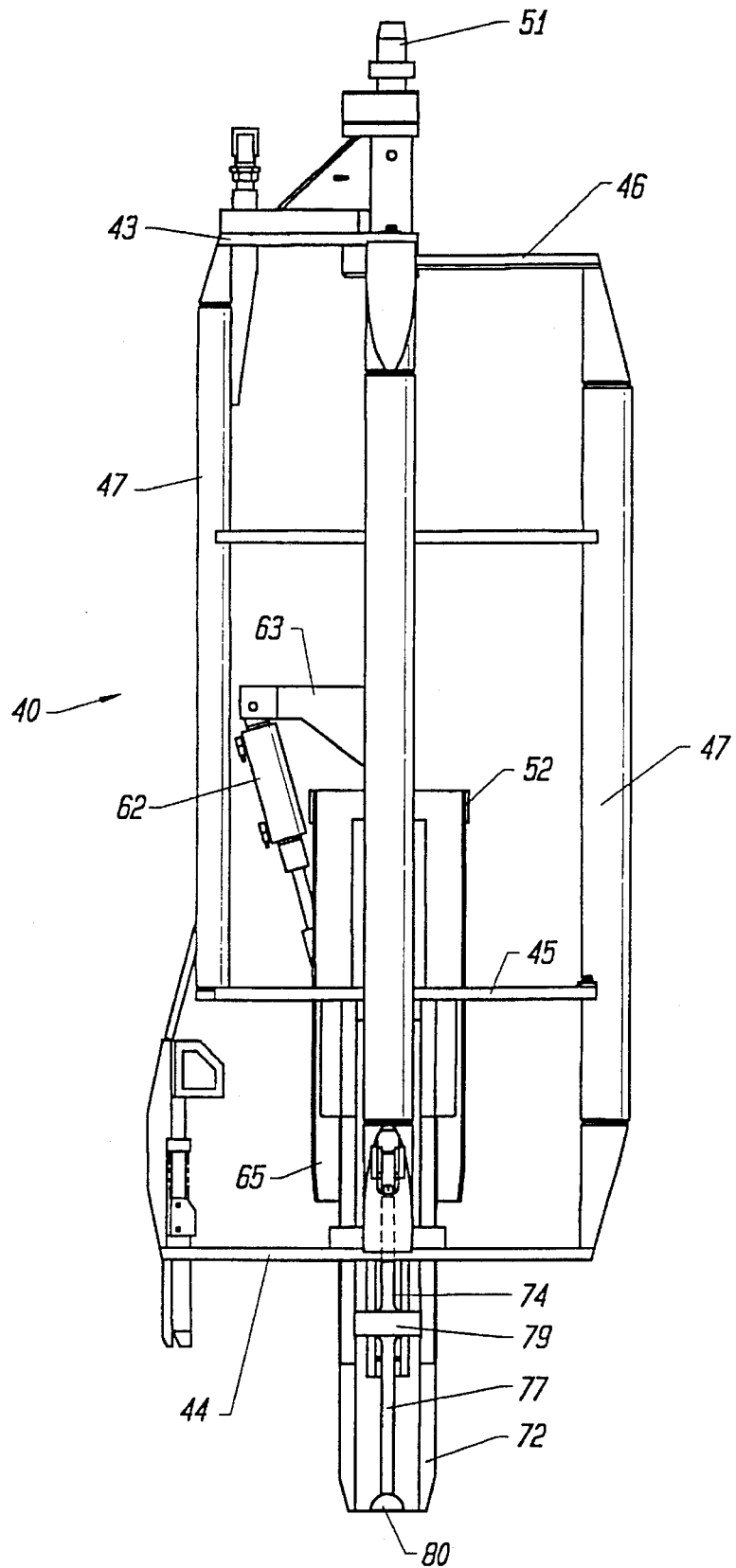
FIG. 2 is a side view of the grapple shown in FIG. 1.
Figure 3:
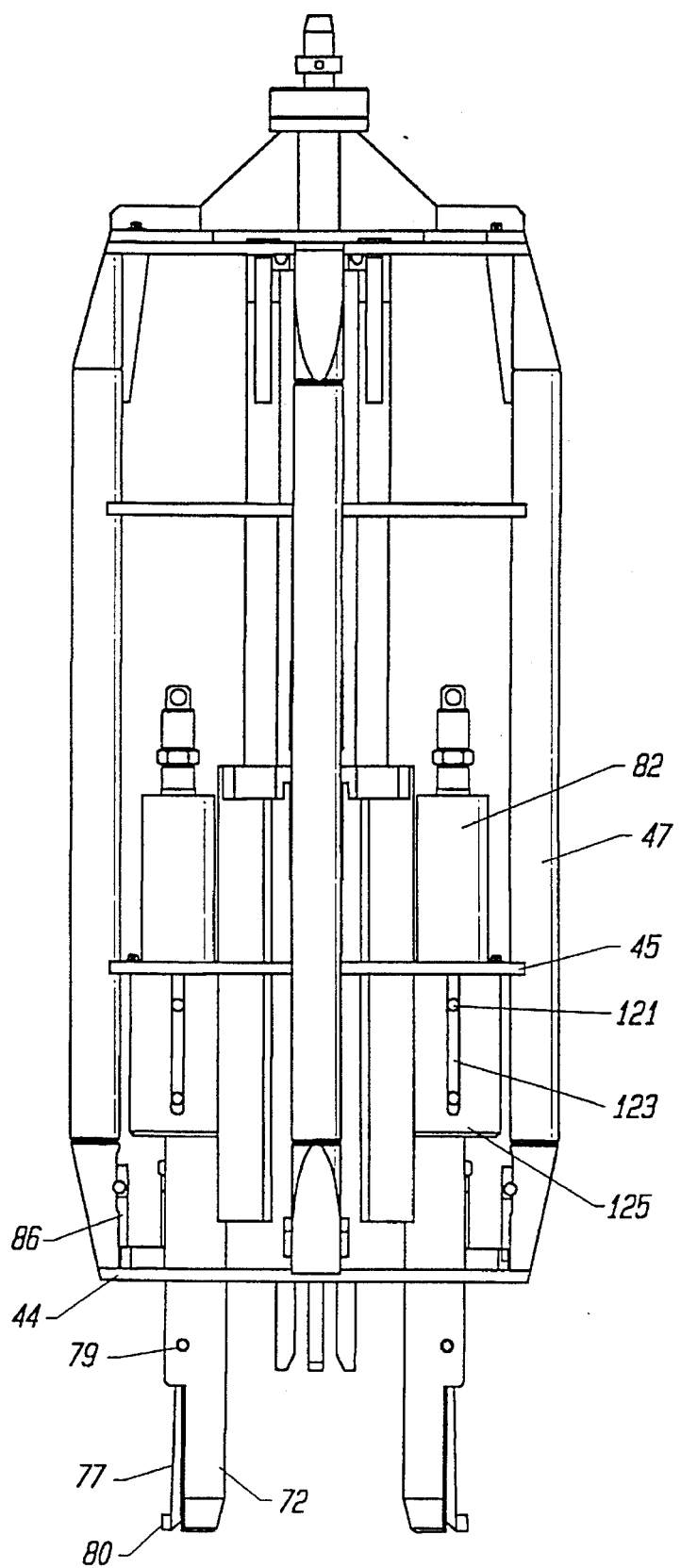
FIG. 3 is a front view of the grapple shown in FIG. 1.

As best seen in FIGS. 1–3, the frame 42 includes a top plate 43, a bottom plate 44, a center plate 45, a support rim 46 positioned between the top and center plates, and a plurality of five frame posts 47. The frame posts 47 extend between the bottom plate 44 and the top plate 43. The frame is an open structure with large central openings being provided in each of the plates and the support rim. This permits an unlatching tool to be inserted through the grapple into place, as will be described in more detail below.

In operation, the upper end of sliding bar 51 is coupled to a hoist cable (not shown) by a threaded connector. The hoist cable can be moved back and forth by an operator working from a refueling platform (not shown) to position the grapple 40 during operation. A header plate 52 is mounted on the bottom (distal) end of the sliding bar 51. A control rod hook 55 is pivotally coupled to a cage 57 that extends downward from the header plate 52. A first end of an air cylinder 62 is attached to the sliding bar 51 by a bracket 63. The second end of the air cylinder 62 is coupled to the control rod hook 55 such that actuation of the air cylinder in a first direction will cause the hook 55 to pivot forward towards the front of the grapple frame 42. When the grapple is properly positioned, this action will cause the control rod hook 55 to move from a withdrawn position to an extended position where it is positioned under the top bail handle 22 of a control rod 20. When the air cylinder is withdrawn, the control rod hook 55 will be withdrawn as well.

A pair of guides 65 are attached to opposing sides of the header plate 52 to assist with positioning the grapple when it is lowered into place. The guides 65 have tapered bottom surfaces that help ensure that the grapple will properly center over the control rod bail handle 22 when the grapple is being lowered into place. They also limit flopping of the control rod when the control rod is being either inserted or withdrawn. The sliding bar 51 carries the entire control rod hooking mechanism 55 and is slidable relative to the frame 42. Therefore, the control rod hooking mechanism is slidable relative to the frame. When the grapple is being lowered into place over a control rod, the frame will move together with the hoist cable until the frame's bottom plate 44 comes into contact with the fuel support. Thereafter, the slider bar 51 will continue downward with the hoist cable until cage 57 seats on the control rod bail handle 22. Thus the grapple is adapted to work with different-sized control rods. Indeed, the slider bar 51 is relatively long in order to accommodate any length control rod. The slider bar also provides the ability to lift the control rod prior to lifting the fuel support. This is desirable in order to verify that the control rod has been unlatched from the control rod drive.

The fuel support hooking mechanisms 70 are mirror images of one another and will be described with reference to FIGS. 1–4. As seen therein, each fuel support hooking mechanism includes a fixed guide 72, a plunger 74, and a pivot bar 77. The fuel support hooking mechanisms are slidably coupled to the frame by a slot and pin arrangement as best seen in FIG. 3. Each guide 72 includes two pairs of opposing vertically spaced pins 121 which fit into a pair of vertically extending opposing slots 123 formed in retaining plates 125 that extend downward from center plate 45. Thus, the fuel support hooking mechanisms can travel a small distance vertically relative to the frame in an amount that is dictated by the arrangement of the pins 121 and slots 123.

The pivot bar 77 is pivotally coupled to the guide 72 by a pivot 79 and has a hook 80 on its distal surface that faces outward. The back surface of the portion of the pivot bar 77 positioned above the pivot 79 is inclined inward relative to the back surface of the portion of the pivot bar located below the pivot. The fuel support hooking mechanisms are mounted to the frame in a manner such that the guides 72 extend well below the frame's bottom plate 44. Thus, when the grapple is properly positioned over the fuel support, the guides 72 will extend into diagonally opposite fuel support flow holes.

Figure 4A:
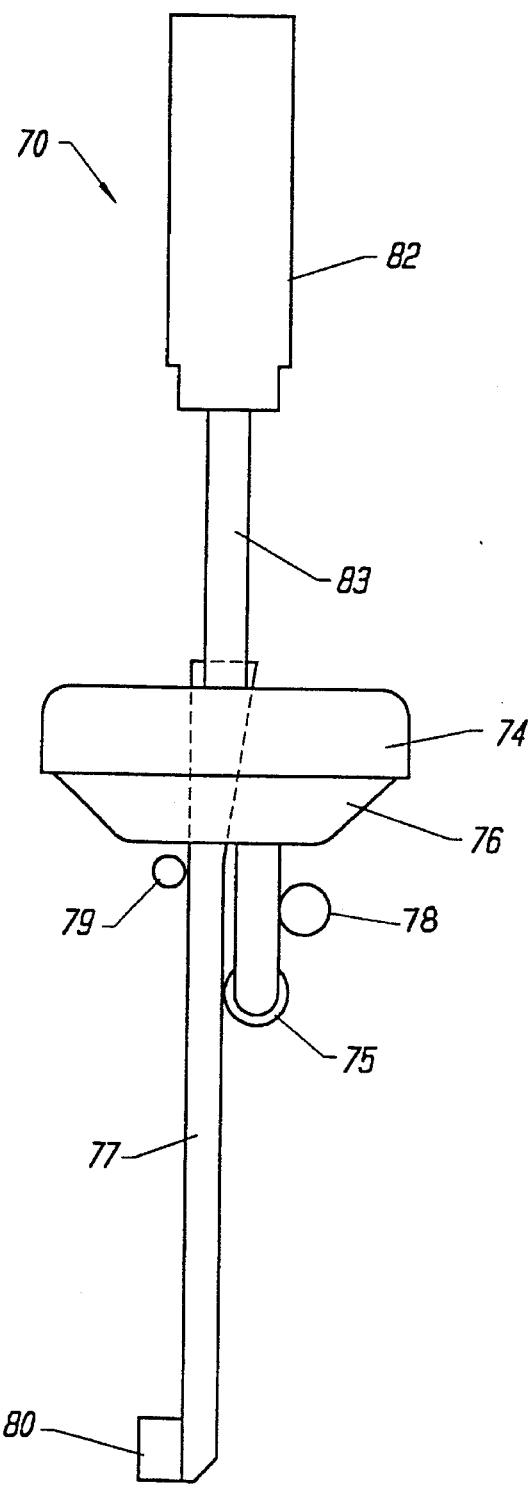
FIGS. 4A and 4B are schematic drawings of the pivot bar portion of a fuel support hooking mechanism that is used to highlight the actuating movement of the plunger.
Figure 4B:
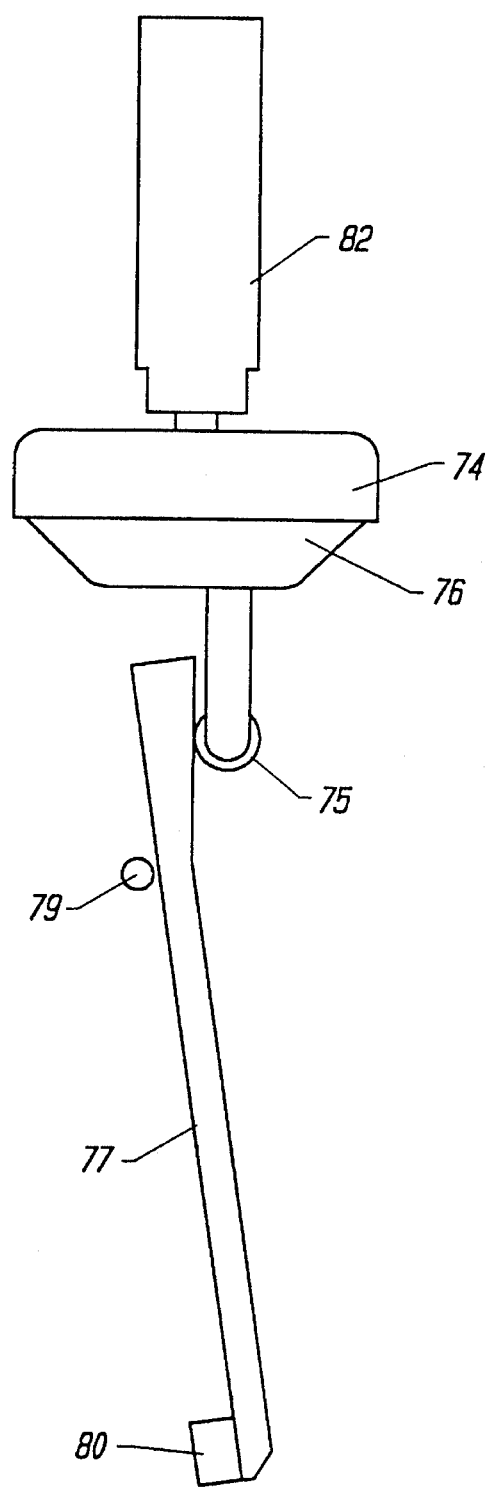

The plunger 74 has a roller 75 positioned at the distal end of a plunger arm and is driven vertically up and down relative to the frame by the rod 83 of an air cylinder 82 mounted on the top of the guides 72. The plunger roller 75 is arranged such that it engages the back surface of the pivot bar 77. A guide roller 78 (see FIG. 4A) is connected to the back side of the plunger arm to run along the guide 72. Thus, as can be best seen in FIG. 4A, when the plunger is extended to a lowered position, the roller 75 engages the flat back surface of the pivot bar at a location that is below the pivot 79. In this position, the hook 80 is pushed outward to a position that can engage a lip in the fuel support's flow channel as represented in FIG. 4A. When the plunger is raised to a withdrawn position, the roller 75 engages the inclined back surface portion of the pivot bar at a location above the pivot 79 as represented in FIG. 4B. In this position, the pivot bar 77 pivots in a counterclockwise direction about the pivot 79 when viewed as seen in FIG. 4A and 4B, such that the hook 80 is pulled back toward the guide 72. In this position the hook cannot grab the lip in the fuel support's flow channel.

The plunger 74 has a substantially frustum-shaped contact pad 76 that is designed to seat on the rim of the fuel support flowhole openings when the air cylinder rod 83 strokes downward. That is, the plunger contact pad will seat on the rim of the beveled openings on the top side of the fuel support. This provides a solid supporting surface that cooperates with the hook to hold the fuel support independent of the rest of the grapple unit. Since the plunger can stroke down a variable distance relative to the hook while still causing the hook to engage, this design can readily and affirmatively pick up fuel supports regardless of the distance between the top of the fuel support and the bend in the flow hole channel. The guide rollers 78 serve to both guide the plunger and support the reaction force of the hook 80.

A pair of mechanical switches 86 (see FIG. 3) are positioned on the top surface of the bottom plate 44 to prevent the air cylinders 82 from releasing while the fuel support is being held. Specifically, it should be appreciated that with the described design, the fuel support will be supported by the plungers 74 and the hooks 80 rather than the bottom plate 44 of the frame 42. Since the fuel support hooking mechanisms 70 are slidable a small distance relative to the frame 42, when the fuel support is lifted, a small gap will be formed between the bottom plate 44 and the fuel support. In this configuration, the switches 86 will not engage the fuel support and therefore will be closed. The switches 86 are arranged such that when they are closed, they will prevent the air cylinder 82 from releasing. On the other hand, when the fuel support has been set on a firm surface the slot and pin arrangement 121,123 will permit the fuel support hooking mechanisms to rise a small amount relative to the frame, which will permit the bottom plate 44 to come into contact with the fuel support, thereby opening the switches. The open switches permit the air cylinders 82 to release when the operator seeks to release the fuel support.

The air cylinders are operated by a pair of air lines (not shown) that are connected to the grapple from the refueling bridge. The center plate 45 has a pair of slotted keyways (not shown) through which a air fittings for the air cylinders 82 extend to provide a coupling for their associated air hose.

Referring next to FIGS. 5, 6A and 6B, the unlatching tool 90 will be described. The unlatching tool 90 includes a housing 92 having an end cap 93 at its lower (distal) end, an actuating rod 101 positioned for slidable movement within the housing 92, a hoist cable attachment (not shown) and an air line attachment (not shown) on its upper (proximal) end, a locating plate 96, an unlatching finger 98 and a mechanism for actuating the unlatching finger. The locating plate 96 is adapted to rest on the fuel support to help position the unlatching tool during use. In the embodiment shown in FIG. 5, the locating plate takes the form of a plate that rests on the fuel support when seated. In alternative embodiments, the locating plate could take the form of a projection that rests on, or engages the upper surface of the control rod bail handle 22.

The finger 98 is pivotally mounted near the distal end of the housing 92 at a pivot point 99 and is coupled to an actuating rod 101 via a linkage 103. The linkage is pivotally mounted to both the finger 98 and the actuating rod 101 as is best seen in FIGS. 6A and 6B. The finger 98 can be moved between a withdrawn position (FIG. 6A) and a fully extended position (FIG. 6B). In the withdrawn position the finger extends substantially in parallel with the housing 92 and is received within an opening 105 near the distal end of the bar. In this position the unlatching tool can be readily inserted through a space formed between the fuel support and a control rod. In the extended position the finger 98 extends substantially perpendicular to the housing 92 such that it can readily engage the control rod release handle. As can be seen in FIGS. 6A and 6B, the finger can be remotely moved between the withdrawn and extended positions by pushing the actuating rod 101 a short distance downward and pulling the actuating rod upward respectively relative to the position of the housing 92. An air cylinder (not shown), supported near the proximal end of the housing 92, can be used to move the actuating rod 101 back and forth. Alternatively cables or other conventional mechanisms could be provided to move the rod back and forth.

To position the unlatching tool 90, an operator seated on the refueling bridge will maneuver the unlatching tool's hoist cable such that the unlatching tool is positioned directly over the grapple 40. The unlatching tool is then lowered through the grapple in a position such that the unlatching tool's end cap 93 is directed into the space between the currently selected control rod and its associated fuel support. The unlatching tool 90 will then be further lowered until the locating plate 96 comes into contact with the fuel support. In this position, the finger 98 should be positioned below the control rod release handle. When the finger 98 is properly positioned, the air cylinder (not shown) is actuated to move the finger 98 to its extended position and the unlatching tool can be maneuvered to position the finger under the release handle. Once the finger is positioned, the entire unlatching tool is lifted up sufficiently to pull the release handle.

The described tool has several advantages. One advantage is that it can be used with the fuel support in place. Another is that it will work with control rods of any length. A third advantage is that when it is used during a control rod moving operation, it can be used with a blade guide (that supports the control rod) seated on the fuel support.

Figure 7:
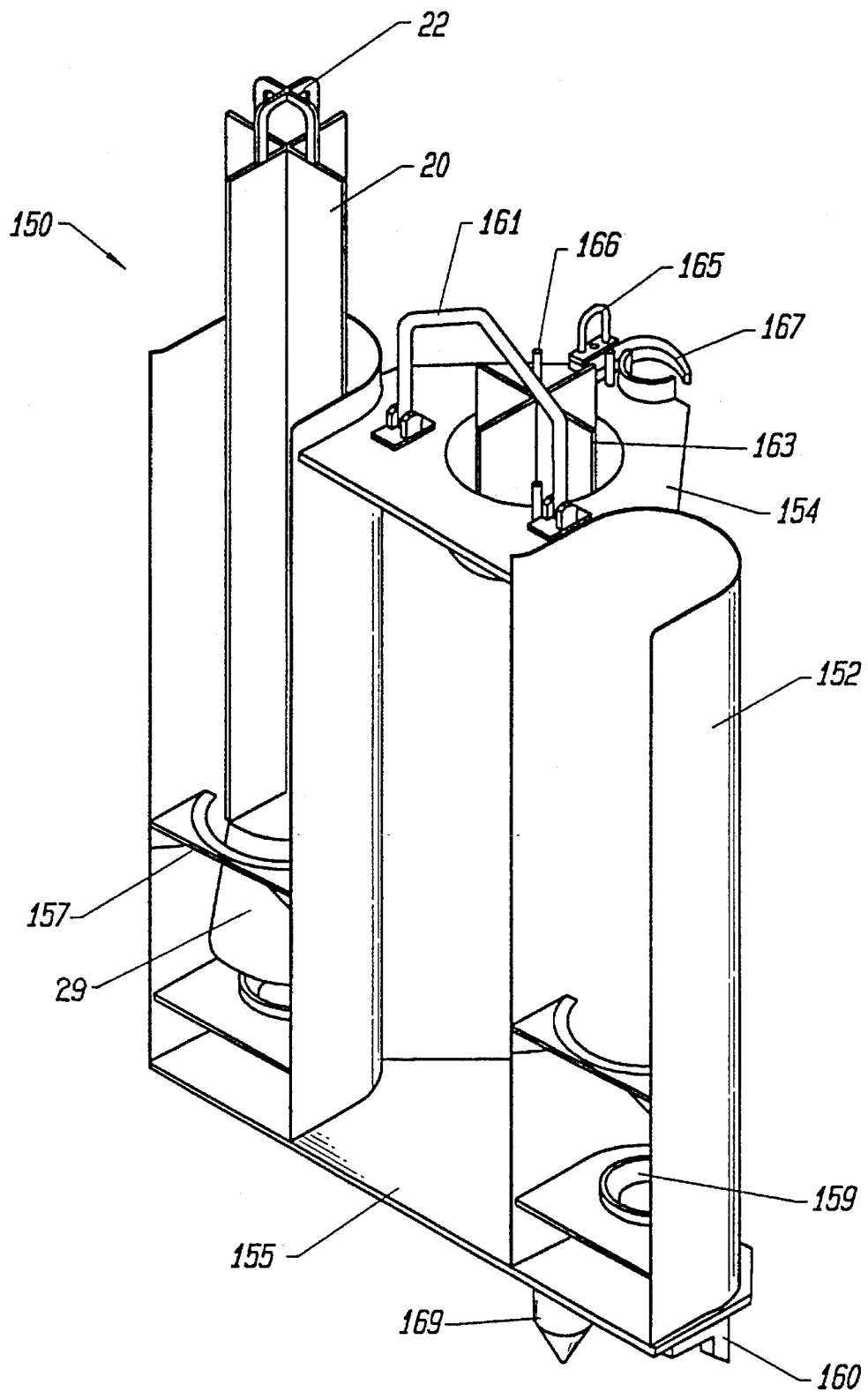
FIG. 7 is a perspective view of a temporary storage rack.

Referring next to FIG. 7, the storage rack 150 will be described. The storage rack 150 includes a pair of substantially parallel troughs 152 that extend between a top plate 154 and a bottom plate 155. Each trough has a shoe-shaped retaining bar 157 that extends across its open front and a seat 159 that is shaped to receive the socket of the velocity limiter. The top plate 154 has a pivoted bail handle 161, a cruciform fuel support storage seat 163, a hook 165, a pair of opposing anti-rotation pins 166 and a spring-loaded safety catch 167. The fuel support storage seat 163 and the anti-rotation pins are provided to receive and position the fuel support respectively. A pair of opposing anti-rotation pins are provided so that the fuel support can be placed on the storage rack 150 in one of two orientations. When the fuel support is properly positioned, the anti-rotation pin will slide into the positioning slot 131 in the bottom plate 44 of the grapple 40. This will actuate the air switch 133 which permits the fuel support hooking mechanisms to release the fuel support. The bail handle 161, the hook 165 and the safety catch 167 are used for installation, securing and removal of the storage rack.

During installation the crane hook holds the storage rack by the bail handle and moves it into place. The spring-loaded safety catch 167 is designed to latch onto one of the pressure vessel guide rods and cooperates with two feet 160 and a centering pin 169 (which extend from the bottom surface of the bottom plate 155) to position the storage rack. Specifically, the pin 169 fits into a hole in the guide rod bracket that extends between the shroud and the guide rod. The feet 160 seat on the upper rim of the shroud. It is contemplated that the storage rack will not be permanently installed within the reactor vessel. Rather, it would be installed during maintenance operations in which the control rods will be repositioned. Thus, the bail handle 161 and the hook 165 will be used for removing the storage rack as well.

Suitable methods of installing, removing and repositioning control rods using the described tools will now be explained. To remove a control rod that is currently installed, an operator stationed on the refueling platform manipulates the grapple hoist cable such that the grapple is lowered into position directly over the selected control rod. When the grapple is positioned over the end of the control rod, the guides 65 slide into the fuel support flowholes to fine position the grapple. As the grapple is lowered, the bottom plate 44 of the frame 42 will come to rest against the fuel support. As the hoist cable is further lowered, the sliding bar 51 will slide relative to the frame until the cage 57 carried by the sliding bar 51 contacts the top of the control rod bail handle 22. In this fully lowered position, the distal ends of the fuel support mechanisms 70 will have Slid into the fuel support flow holes and the bottom plate 44 will rest on the top of the fuel support. At the same time, the control rod hooking mechanism 55 rest on the bail handle 22.

The air cylinders 62 and 82 are then actuated to pivot the control rod hook 55 and the fuel support hooks 80 into place respectively. Of course the actuation of air cylinder 82 also serves to seat the plunger's contact pads 76 into their tapered fuel support flow hole openings. In this position, (or before the air cylinders have been actuated) the unlatching tool may be lowered into place as discussed above. After the control rod release handle has been pulled and the air cylinders 62 and 82 have been actuated, the grapple's sliding bar 51 is lifted a small amount to verify that the control rod drive has been properly released. If for any reason the control rod drive has not been fully released, the operator will repull the release handle 24 using the unlatching tool 90. Assuming the control rod drive has been properly released, the unlatching tool is removed from the fuel cell. Thereafter, the grapple hoist cable can be lifted. When this occurs, the control rod will be lifted before the fuel support (due to movement of the sliding bar 51 relative to the frame 42). Thus, the operator can verify that the grapple has a good hold of the control rod. Thereafter the bracket 63 comes into contact with the top plate 43 and the entire grapple is lifted, which serves to simultaneously lift the control rod and the fuel support from a fuel channel.

It is contemplated that the fuel support will always be removed together with the control rod. Therefore, when the control rod is to be discarded after it has been removed, the grapple can be used to remove both the control rod and the fuel support. The control rod can then be lifted out of the pressure vessel and placed into the fuel pool. A new control rod can then be picked up by the grapple and inserted into the selected core location together with the original fuel support which was continually held by the grapple. If for any reason the grapple needs to be used for other purposes, the fuel support can be placed in an appropriate storage location which may be in the storage rack or on the reactor floor.

On the other hand, when the position of the control rod is to be shifted about the core, both the fuel support and the control rod will be placed in the storage rack 150. That is, the control rod 20 will initially be placed in one of the troughs 152. Thereafter, the fuel support is placed on the storage seat 163. When the fuel support is properly positioned over the anti-rotation pins 166, it can be released. Thereafter, the grapple and unlatching tool will be positioned over a second control rod located at the position at which the first control rod is to be shifted to. The second control rod and its associated fuel support are then removed in the same manner as described above. The second control rod is then placed in a second trough while the second fuel support remains held by the grapple. The grapple is then used to pick up the first control rod from the storage rack. The first control rod, together with the second fuel support are then inserted into the second channel. This process can be repeated as necessary to shift or replace all of the control rods that are to be moved. When a control rod is to be inserted into the position from which the fuel support on the storage rack came, the fuel support on the storage rack is picked up together with the selected control rod and placed in the corresponding channel.

Although only one embodiment of the tools of the present invention have been described, it should be understood that the present invention may be embodied in other specific forms without departing from the spirit or scope of the invention. For example, the hooking mechanisms can all be varied somewhat. If desired, additional troughs and/or fuel support storage seats could be added to the storage rack. Further, the tools can be used independently and/or independent of the described method of rearranging control rods. It is not a requirement that the fuel supports be returned to the same fuel channel from which they came. Rather, the described tools can be used to facilitate any switching; arrangement that is deemed appropriate for a particular reactor. Therefore, the present examples are to be considered as illustrative and not restrictive, and the invention is not to be limited to the details given herein, but may be modified within the scope of the appended claims.

I claim:

1. An unlatching tool for pulling a control rod release handle carried by a control rod for decoupling the control rod from a control rod drive in a boiling water reactor without first removing the associated fuel support, comprising:

an elongated housing having an end cap at a distal end and a hoist cable attachment on its proximal end;

no more than one unlatching finger pivotally mounted to the elongated housing near the distal end of the elongated housing;

a positioning projection for contacting the fuel support to position the unlatching tool such that the unlatching finger is at a predetermined elevation relative to the control rod release handle; and a mechanism for actuating the unlatching finger, the actuating mechanism comprising an actuating rod slidably mounted in the elongated housing for movement in a longitudinal direction parallel to the length of the elongated housing and a linkage that couples the fidger to the actuating rod, wherein the actuating mechanism is adapted to move the finger between a retracted position wherein the finger is substantially parallel with the elongated housing and an extended position wherein the finger extends substantially perpendicular to the elongated housing such that the finger can readily engage the control rod release handle when the unlatching tool is lifted, and said linkage has a cutout which is L-shaped.

2. An unlatching tool for pulling a control rod release handle carried by a control rod for decoupling the control rod from a control rod drive in a boiling water reactor without first removing the associated fuel support, comprising:

an elongated housing having an end cap at a distal end and a hoist cable attachment on its proximal end;

no more than one unlatching finger pivotally mounted to the elongated housing near said distal end of said elongated housing; and a mechanism for actuating said unlatching finger, said actuating mechanism comprising an actuating rod slidably mounted in the said elongated housing for movement in a longitudinal direction parallel to the length of said elongated housing and a linkage that couples said unlatching finger to said actuating rod, wherein said actuating mechanism is adapted to move said unlatching finger between a retracted position wherein said unlatching finger is substantially parallel with said elongated housing and an extended position wherein said unlatching finger extends substantially perpendicular to said elongated housing such that said unlatching finger can readily engage the control rod release handle when the unlatching tool is lifted, and said linkage has a cutout which is L-shaped.

* * * * *